United States Patent
Zaifman et al.

(10) Patent No.: US 9,594,901 B2
(45) Date of Patent: Mar. 14, 2017

(54) METHODS, SYSTEMS, AND PRODUCTS FOR SECURE ACCESS TO FILE SYSTEM STRUCTURES

(75) Inventors: Arthur Zaifman, Millburn, NJ (US); Govind Chidambaram, Lake Haiwatha, NJ (US); Jimmy Tant, Union, NJ (US); Suraj Kumar Varma, San Mateo, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1889 days.

(21) Appl. No.: 12/326,232

(22) Filed: Dec. 2, 2008

(65) Prior Publication Data

US 2010/0138922 A1 Jun. 3, 2010

(51) Int. Cl.
| | |
|---|---|
| G06F 17/00 | (2006.01) |
| G06F 21/55 | (2013.01) |
| G06F 21/57 | (2013.01) |
| G06F 21/62 | (2013.01) |

(52) U.S. Cl.
CPC .......... G06F 21/554 (2013.01); G06F 21/577 (2013.01); G06F 21/6218 (2013.01); *G06F 2221/2141* (2013.01)

(58) Field of Classification Search
CPC . G06F 21/6218; G06F 21/577; H04L 63/1433
USPC ................................ 707/786, 787, 788, 829
See application file for complete search history.

(56) References Cited

U.S. PATENT DOCUMENTS

| | | | |
|---|---|---|---|
| 4,984,272 A | 1/1991 | McIlroy | |
| 5,347,578 A * | 9/1994 | Duxbury | 707/781 |
| 5,544,246 A | 8/1996 | Mandelbaum | |
| 5,566,326 A | 10/1996 | Hirsch | |
| 5,584,022 A | 12/1996 | Kikuchi | |
| 5,881,225 A | 3/1999 | Worth | |
| 6,408,298 B1 * | 6/2002 | Van et al. | |
| 6,535,879 B1 * | 3/2003 | Behera | 707/785 |
| 7,131,000 B2 | 10/2006 | Bradee | |
| 7,249,379 B2 | 7/2007 | Larsen | |
| 7,630,985 B2 * | 12/2009 | Sunada | |
| 8,316,051 B1 * | 11/2012 | Burns | G06F 21/6227 707/694 |
| 8,438,611 B2 * | 5/2013 | Faitelson | G06F 17/30587 726/2 |
| 2003/0229623 A1 * | 12/2003 | Chang | G06F 21/6218 |
| 2005/0102510 A1 | 5/2005 | Patrick | |
| 2005/0257266 A1 | 11/2005 | Cook | |
| 2006/0095762 A1 | 5/2006 | Hosokawa | |
| 2007/0050377 A1 | 3/2007 | Srivastava | |
| 2009/0100058 A1 * | 4/2009 | Faitelson | G06F 17/30587 |

* cited by examiner

*Primary Examiner* — Marc Filipczyk
(74) *Attorney, Agent, or Firm* — Scott P. Zimmerman, PLLC

(57) ABSTRACT

Methods, systems, and products are disclosed for securing access to a file system. A directory is established in a hierarchical file structure having access permission defined by a first owner. A subdirectory is established in the directory. A sub-level subdirectory is established in the subdirectory having access permissions defined by a second owner. The subdirectory is publically accessible to anyone satisfying the access permission defined by the first owner, such that a change directory system call is executed for a user in the subdirectory, even though the user has not authenticated the access permission defined by the second owner.

20 Claims, 19 Drawing Sheets

FIG. 1

```
$ id
uid=2003(u1) gid=2000(dev)
$ pwd
/export/home/zaifman/test/d1
$ ls -ld
drwx------   3 u1    root        512 Apr 19 12:21 .
$ ls -l
total 2
drwx------   2 u2    root        512 Apr 19 12:21 d2
$ cd d2
ksh: d2: permission denied
$ su u2
Password:
cannot access parent directories
$ id
uid=2004(u2) gid=2000(dev)
$ cd d2
ksh: d2: permission denied
```

FIG. 4

```
$ id
uid=2003(u1) gid=2000(dev)
$ pwd
/export/home/zaifman/test/d1
$ ls -ld
drwx------   3 u1    root       512 Apr 19 12:21 .
$ ls -l
total 2
drwx------   2 u2    root       512 Apr 19 12:21 d2
$ cd d2
ksh: d2: permission denied
$ su u2
Password:
cannot access parent directories
$ id
uid=2004(u2) gid=2000(dev)
$ cd d2
ksh: d2: permission denied
```

FIG. 5

```
$ id
uid=2003(u1) gid=2000(dev)
$ pwd
/export/home/zaifman/test/d1
$ ls -ld
drwx------   3 u1     root        512 Apr 21 20:52 .
$ ls -l
total 2
drwxr-xr-x   3 u2     root        512 Apr 21 20:52 hold
$ cd hold
$ cd d2
ksh: d2: permission denied
$ su u2
Password:
cannot access parent directories
$ id
uid=2004(u2) gid=2000(dev)
$ cd d2
$ ls -ld
drwx------   2 u2     root        512 Apr 21 20:52 .
```

FIG. 10

```
#!/export/home/zaifman/EXPECT/expect-5.43/expect
# This is file su.exp
set timeout -1
gets stdin cred
set currcred [lindex [split $cred ,] 0]
set id [lindex [split $currcred :] 0]
set pw [lindex [split $currcred :] 1]
spawn -ignore SIGHUP /bin/su $id -c "echo $cred | /export/home/zaifman/2008-0615/traverse.ksh"
sleep 1
expect Password:
send "$pw\r"
expect "\r\n"
```

FIG. 11

```
#!/usr/bin/ksh
# This is file traverse.ksh
export LD_LIBRARY_PATH=/usr/lib:/usr/local/lib:/usr/sfw/lib:/export/home/zaifman/TCL/TCLTK8.4/TCL/tcl8.4.4/unix
cat - | sed 's,/,/' | read currcred cred
print $currcred | cut -f3 -d: | read dir
cd $dir
if [ ! -z $cred ]
then
    print $cred | /export/home/zaifman/2008-0615/su.exp
else
    cat pot-of-gold | mailx -s pot-of-gold zaifman@research.att.com
fi
```

FIG. 12

```
#!/usr/bin/ksh
# This is file run.ksh
. $HOME/.profile
cd 2008-0615
read creds
echo $creds | ./su.exp
```

FIG. 15 d1:

total 4 dr-xr-xr-x  3 u2      512 Apr 23 19:42 hold1 dr-xr-xr-x  3 u2      512 Apr 23 19:42 hold2 d1/hold1:

total 2 drwx------  2 u2      512 Apr 23 19:42 d2 d1/hold1/d2:

total 0 d1/hold2:

total 2 drwx------  4 u2      512 Apr 23 20:06 d2 d1/hold2/d2:

total 4 dr-xr-xr-x  3 u3      512 Apr 23 20:07 hold1 dr-xr-xr-x  3 u3      512 Apr 23 20:09 hold2 d1/hold2/d2/hold1:

total 2 drwx------  2 u3      512 Apr 23 20:08 d1 d1/hold2/d2/hold1/d1:

total 2

-rwx------  1 u3       34 Apr 23 20:08 pot-of-gold d1/hold2/d2/hold2:

total 2 drwx------  2 u3      512 Apr 23 20:09 d2 d1/hold2/d2/hold2/d2:

total 0

METHODS, SYSTEMS, AND PRODUCTS FOR SECURE ACCESS TO FILE SYSTEM STRUCTURES

COPYRIGHT NOTIFICATION

A portion of the disclosure of this patent document and its attachments contain material which is subject to copyright protection. The copyright owner has no objection to the facsimile reproduction by anyone of the patent document of the patent disclosure, as it appears in the Patent and Trademark Office patent files or records, but otherwise reserves all copyrights whatsoever.

BACKGROUND

Exemplary embodiments generally relate to electrical computers and digital processing systems and, more particularly, to file protection and security levels.

Computer and network security is a common concern. Nearly every day some virus, threat, or "hacker" makes the news. Many computer experts thus devote themselves to developing schemes that improve the security of sensitive data and files. These past and current schemes, though, are all based on monitoring or alerting when suspicious access patterns are detected. These conventional schemes are thus best-effort and can only limit the amount of data stolen. These conventional schemes cannot prevent data from being stolen. Other conventional schemes also protect using a single user identification per document repository.

FIG. 1 illustrates one of the conventional security schemes. FIG. 1 structurally illustrates POSIX statements for traversing a directory structure " . . . d1/d2 . . . ." The POSIX file system semantics make it nearly impossible to traverse the " . . . d1/d2 . . . " path as a non-privileged user (that is, a user not possessing the correct root id), where directories "d1" and "d2" each have "0700" permissions with respective ownership of u1 and u2. As FIG. 1 illustrates, the non-privileged user is prevented from traversing the " . . . d1/d2 . . . " path due to the requirements for executing a "change directory" system call. The change directory" system call requires a process to have "search" (e.g., execute) permission in the current directory before the process may advance to the next directory. Here, though, directories "d1" and "d2" are accessible only to their respective owners (e.g., user "u1" and user "u2").

SUMMARY

Exemplary embodiments provide methods, systems, and products for securing access to a file system. Exemplary embodiments describe a hierarchical file structure having an access scheme that provides scalable protection for shared, electronic documents. Exemplary embodiments establish a publically-accessible subdirectory in the hierarchical file structure. That is, if a user successfully authenticates the access permissions of an upper-level directory, then the user has global search permissions in a lower-level subdirectory. Here, though, the user is held in the subdirectory until the user successfully authenticates any access permissions for lower-level subdirectories. The user, then, must satisfy directory-level access permissions to access the publically-accessible subdirectory. The user, though, is prevented from accessing lower-level subdirectories until further access permissions are satisfied. Here, then, the user is required to authenticate two separate times in order to traverse the hierarchical file structure from the directory, to the subdirectory, and then to the lower-level subdirectory. This access scheme is scalable, such that N different layers in the hierarchical file structure may require N different authentications.

Exemplary embodiments include a method for securing access to a file system. A directory is traversed in a hierarchical file structure having a first access permission requirement. A subdirectory in the directory is established that has a global search permission. A sub-level subdirectory in the subdirectory is also established having a second access permission requirement. When a user successfully authenticates to the first access permission requirement of the directory, then the user is permitted to execute a change directory system call in the subdirectory, even though the user has not authenticated the second access permission requirement for the sub-level subdirectory.

More exemplary embodiments include a system for securing access to a file system. Means are disclosed for establishing a directory in a hierarchical file structure having access permission defined by a first owner. Means for establishing a subdirectory in the directory is included. Means are also included for establishing a sub-level subdirectory in the subdirectory having access permissions defined by a second owner. When a user successfully authenticates the access permission of the directory, then means are included for executing a change directory system call in the subdirectory, even though the user has not successfully authenticated the access permissions defined by the second owner.

Still more exemplary embodiments include a computer readable medium that stores instructions for performing a method of securing access to a file system. A processor executes an operating system stored in memory, and the operating system has a hierarchical file structure. A directory in the hierarchical file structure is accessed having access permission defined by a first owner. A subdirectory in the directory is accessed. A sub-level subdirectory in the subdirectory is read having access permission defined by a second owner. A change directory system call is executed in the subdirectory for a user that successfully authenticates the access permission of the directory, even though the user has not successfully authenticated the access permissions defined by the second owner for the sub-level subdirectory. An access time for an invalid directory path is compared to a threshold access time. When the access time equals or exceeds the threshold access time, then the method notifies of a security threat.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein:

FIG. 1 illustrates a conventional, prior art directory structure;

FIGS. 4 and 5 are screen prints of physical views of an enhanced access system, according to exemplary embodiments;

FIGS. 9-13 are schematics illustrating examples of enhanced file access structures, according to exemplary embodiments;

FIGS. 14 and 15 are schematics illustrating more examples of enhanced file access structures, according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 2:
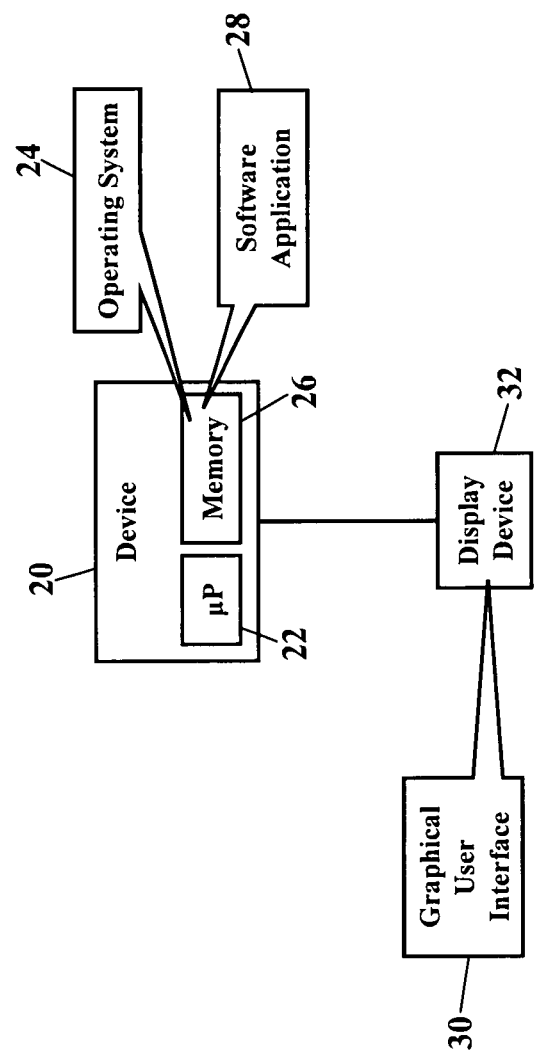
FIGS. 2 and 3 are simplified schematics illustrating an environment in which exemplary embodiments may be implemented.
Figure 3:
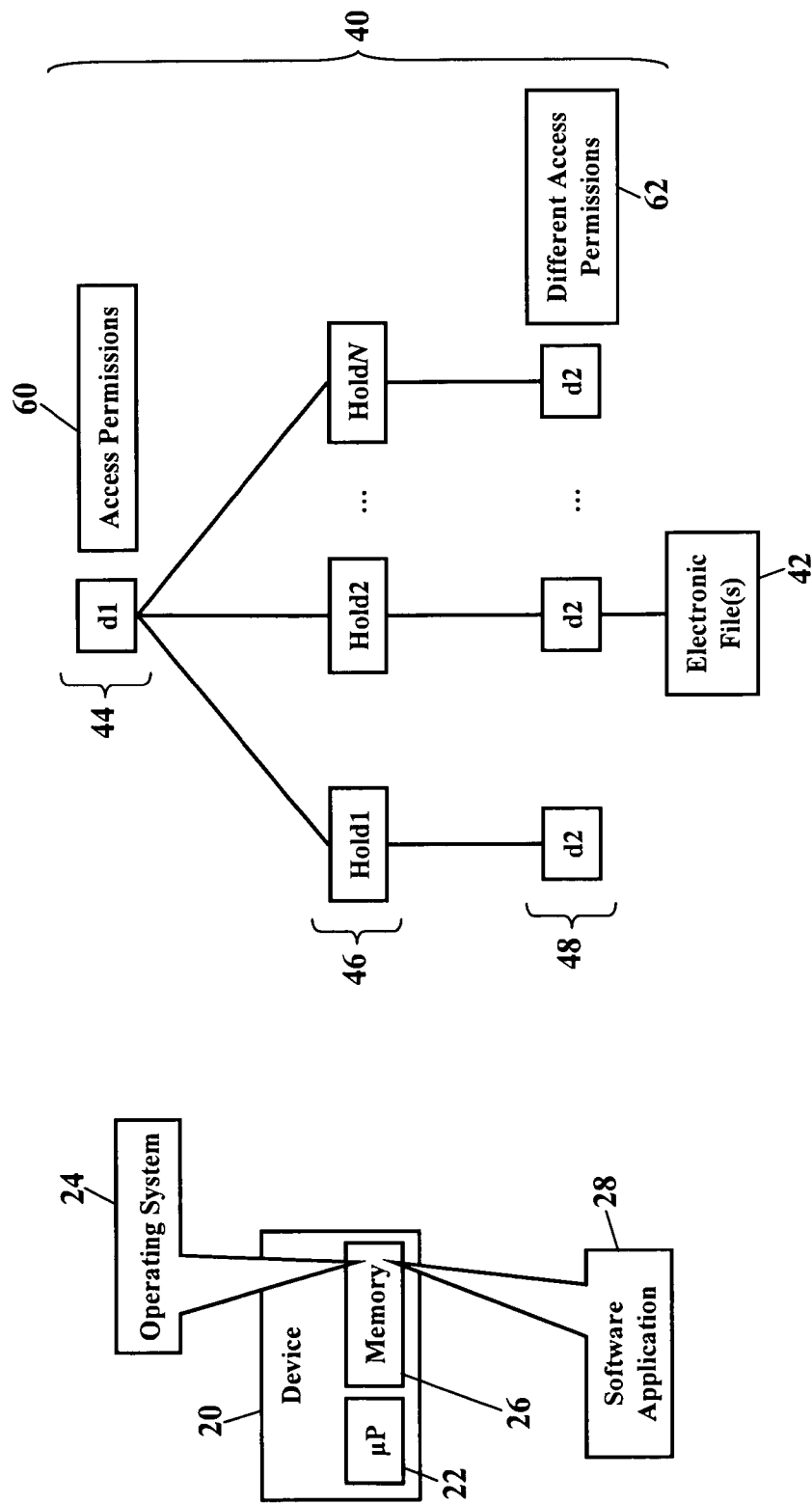

FIGS. 2 and 3 are simplified schematics illustrating an environment in which exemplary embodiments may be implemented. A device 20 has a processor 22 (e.g., "µP"), application specific integrated circuit (ASIC), or other component that executes an operating system 24 stored in a memory 26. The processor 22 may also execute a software application 28 that is also stored in the memory 26. The operating system 24 acts as a host for the software application 28. The operating system 24 and the software application 28 may thus cooperate to cause the processor 22 to produce a graphical user interface 30. The graphical user interface 30 is illustrated as being visually produced on a display device 32, yet the graphical user interface 30 may also have audible features. Although the device 20 is generically shown, the device 20, as later paragraphs will explain, may be a computer, a personal digital assistant (PDA), a cordless/cellular/IP phone, digital music player, radio, or any other processor-controlled device.

FIG. 3 illustrates a hierarchical file structure 40. The processor 22 and/or the operating system 24 traverse the hierarchical file structure 40 to save and to retrieve electronic files 42 that are stored in the memory 26. The operating system 24 uses the hierarchical file structure 40 to organize and track the electronic files 42. The hierarchical file structure 40 uses one or more directories to organize the electronic files 42 into a tree structure. FIG. 3 illustrates the hierarchical file structure 40 having an upper level directory 44, a mid-level subdirectory 46, and a lower-level subdirectory 48. The general structure of the hierarchical file structure 40 is well-known to those of ordinary skill in the art and, thus, not described in detail.

Here, though, exemplary embodiments establish a scalable and secure access scheme for the hierarchical file structure 40. Before a user of the device 20 may traverse the hierarchical file structure 40 to access the lower-level subdirectory 48, the user must first satisfy one or more different authentication requirements. The user, for example, may need to successfully authenticate any access permissions 60 associated with the upper level directory 44. The traversing user, for example, may be required to input a correct password before the user may continue traversing the hierarchical file structure 40 to other files and/or levels. When the user satisfies the access permissions 60, then the user is permitted to traverse the hierarchical file structure 40 to the mid-level subdirectory 46. If the user wishes to continue traversing the hierarchical file structure 40 into the lower-level subdirectory 48, then the user must satisfy different access permissions 62 associated with the lower-level subdirectory 48. That is, the user is required to authenticate two separate times in order to traverse the hierarchical file structure 40 from the upper level directory 44 to the lower-level subdirectory 48.

The mid-level subdirectory 46 may thus be publicly accessible. If a user successfully authenticates the access permissions 60 of the upper level directory 44, then exemplary embodiments allow the user to have global search permissions in the mid-level subdirectory 46. That is, the user is "held" in the mid-level subdirectory 46 until the user successfully authenticates the different access permissions 62 associated with the lower-level subdirectory 48. Even though the user has global search permissions in the mid-level subdirectory 46, exemplary embodiments may prevent the user from accessing the lower-level subdirectory 48 until the different access permissions 62 are satisfied. The user must therefore successfully authenticate two separate times in order to traverse the hierarchical file structure 40. As later paragraphs will explain, this access scheme is scalable, such that N different layers in the hierarchical file structure 40 may require N different authentications. Progress through the hierarchical file structure 40 is impeded by the successive requirements to authenticate. Different owners may establish different permissions for each hierarchical level in the hierarchical file structure 40.

Exemplary embodiments may be explained using path notation. The hierarchical file structure 40 illustrated in FIG. 3 may be equally represented by the path d1/hold/d2/hold, where "d1," "d2," and "hold" are directories. The "d1" and "d2" directories may only allow access to their respective owners. That is, directory "d1" may have its own access permission (such as the access permissions 60 associated with the upper level directory 44), while directory "d2" has its own and different access permissions (such as the different access permissions 62 associated with the lower-level subdirectory 48). The "hold" directory, however, allows access to anyone (as the mid-level subdirectory 46 permits). If a user wants to traverse from directory "d1" to directory "d2," the user must first successfully authenticate the access permissions of directory "d1." If the user, for example, enters the correct password for directory "d1," then the user traverses to the "d1/hold" directory. Here, though, the user is "held" in the "d1/hold" directory until the user successfully authenticates the different access permissions required by the "d1/hold/d2" directory. That is, exemplary embodiments may allow the user to have global search permissions in the "d1/hold" directory, but the user may need to again authenticate before accessing the "d1/hold/d2" directory. The user must therefore successfully authenticate two separate times in order to traverse from directory "d1" to directory "d1/hold/d2."

An analogy may help explain the different authentications. The above access scheme can be analogized to the cockpit of a jet airliner. When a co-pilot needs to access the cockpit, the co-pilot's access procedure may be written as firstclasscabin/door1/hold/door2.

Imagine a co-pilot walking from the jet way, through the fuselage access door, and onto the jet airliner. The co-pilot enters the first class cabin area. The first class cabin (e.g., directory "firstclasscabin") may share the same space as a first doorway (e.g., directory "door1") to the jet's cockpit. When the co-pilot unlocks the first doorway (directory "door1"), the co-pilot enters a holding area (e.g., directory "hold"). The co-pilot then closes and locks the first doorway (directory "door1") to prevent unauthorized entry to the holding area (directory "hold"). The pilot in the cockpit scans the holding area (directory "hold") and authenticates the co-pilot. When the co-pilot is authenticated, a second door (e.g., directory "door2") to the cockpit unlocks, thus allowing the co-pilot to enter the jet's cockpit.

Exemplary embodiments thus describe a two-phase access scheme. A first phase describes authenticating, accessing, and "holding" in the "d1/hold" directory. When the user successfully performs a second authentication, then the user is permitted access to the "d1/hold/d2" directory. The user, then, must first authenticate against the access credentials established by an owner of the "d1" directory. If the user is successful, the user enters the "d1/hold" directory. Here, though, the user is required to authenticate against the access credentials of an owner of the "d2" directory. If the access permissions or credentials of directories "d1" and "d2" are different (e.g., different owners for each directory), then the user must successfully authenticate two different times. That is, the user must twice succeed to access the "d2" directory. This two-phase access scheme greatly complicates a potential hacker's efforts and, thus, improves the security of files stored in the "d2" directory.

Exemplary embodiments may be incorporated into any operating system. As those of ordinary skill in the art understand, the operating system 24 may be considered a master control program for the device 20. When the device 20 is powered, the operating system 24 loads from the memory 26 (perhaps using an auto-executing "boot" program). The operating system 24 (commonly abbreviated "OS" or "O/S") manages the software and hardware components of the device 20. There are many different operating systems (such as MICROSOFT® WINDOWS®, MAC® OS, UNIX®, LINUX®, and SOLARIS®), and exemplary embodiments may be integrated or incorporated into any operating system. Because operating systems are well known, no further explanation is needed.

The device 20 is only simply illustrated. Because the architecture and operating principles of processor-controlled devices are well known, their hardware and software components are not further shown and described. If the reader desires more details, the reader is invited to consult the following sources: ANDREW TANENBAUM, COMPUTER NETWORKS ($4^{th}$ edition 2003); WILLIAM STALLINGS, COMPUTER ORGANIZATION AND ARCHITECTURE: DESIGNING FOR PERFORMANCE ($7^{th}$ Ed., 2005); and DAVID A. PATTERSON & JOHN L. HENNESSY, COMPUTER ORGANIZATION AND DESIGN: THE HARDWARE/SOFTWARE INTERFACE ($3^{rd}$. Edition 2004).

FIGS. 4 and 5 are screen prints of physical views of an enhanced access system, according to exemplary embodiments. FIG. 4 illustrates POSIX statements when a non-privileged user attempts to access the conventional directory "d1/d2" structure. As those of ordinary skill in the art recognize, POSIX ("Portable Operating System Interface for UNIX") is a set of standard interface statements between programs and operating systems. Because POSIX is well-known, no further description is needed. The conventional POSIX file system semantics makes it impossible for a non-privileged user (i.e., entry of non-root password or other identification) to traverse the path " . . . /d1/d2/ . . . ," where directory "d1" and directory "d2" each have 0700 permissions with respective ownership of user "u1" and user "u2." Here the "change directory" system call (e.g., "cd" or "chdir") requires a process to have "search" permission (or "execute" permission) in the current directory before the process may traverse or advance to the next directory. Directories "d1" and "d2," though, are accessible only to their respective owners (e.g., user "u1" and user "u2"). FIG. 5, however, illustrates the two-phase " . . . /d1/hold/d2/ . . . " access scheme according to exemplary embodiments. The "hold" directory may be owned by user "u2" and has global search permissions. The "hold" directory, then, allows the "change directory" system call (e.g., "cd" or "chdir") to successfully complete, even though the user has not authenticated for directory "d2."

Exemplary embodiments thus change access permissions. If a user wishes to traverse the path " . . . /d1/d2/ . . . ," the POSIX semantics concerning the "change directory" system call may prevent changing directories if the "current directory" (e.g., the directory from which a "setuid" system call was executed) is not accessible to a new identity. Exemplary embodiments, though, may change the permissions assigned to each of the directories. The intermediate directory "d1/hold" has access permissions that allow at least access to both a current identity and a new identity. The intermediate directory "d1/hold" forces the user to "hold" with global search permissions. The user is "held" in the intermediate directory "d1/hold" until the user successfully authenticates for the "d1/hold/d2" directory.

Figure 6:
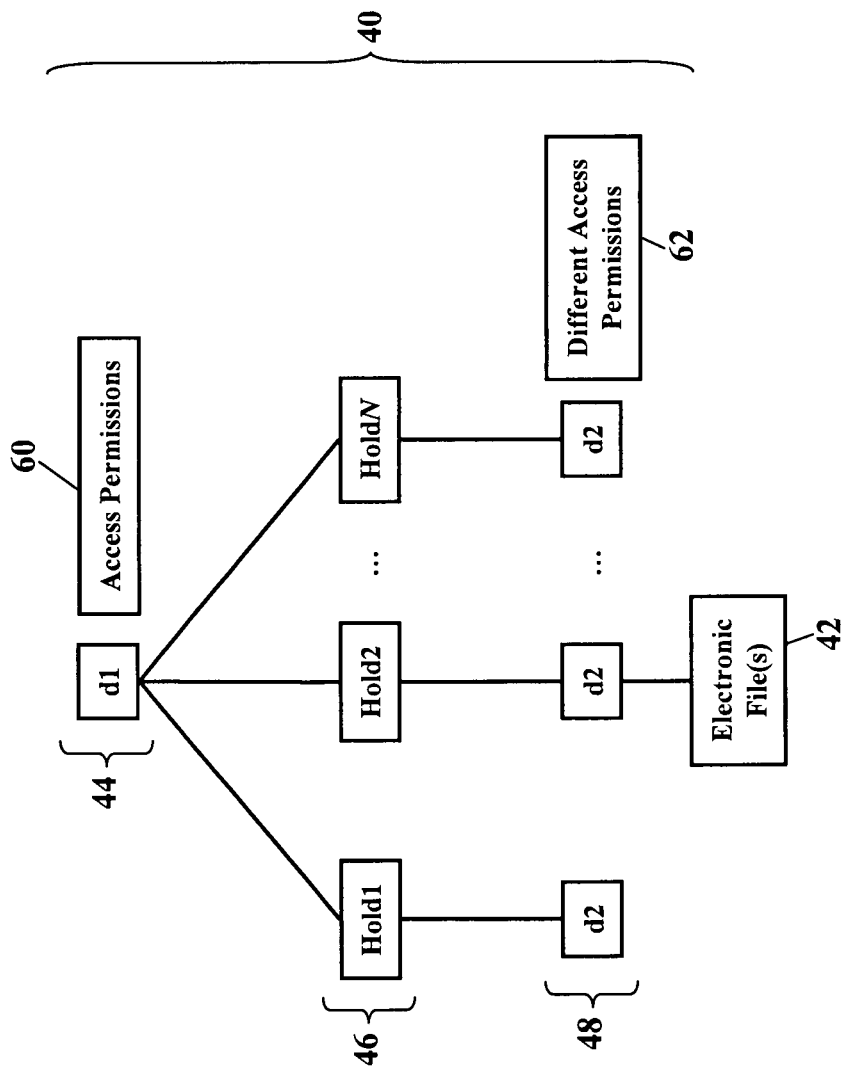
FIGS. 6-8 are schematics illustrating security enhancements, according to exemplary embodiments.
Figure 7:
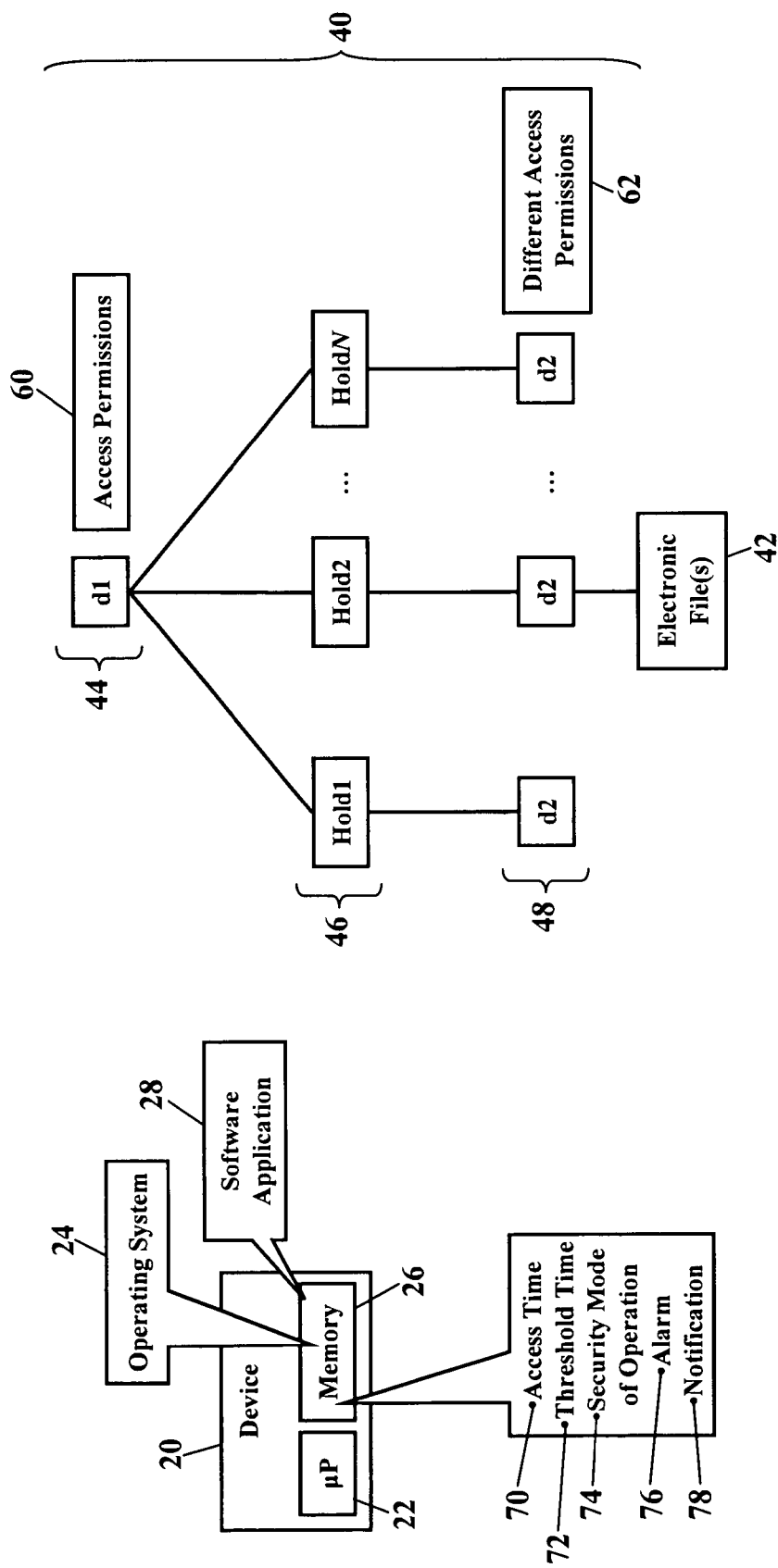
Figure 8:
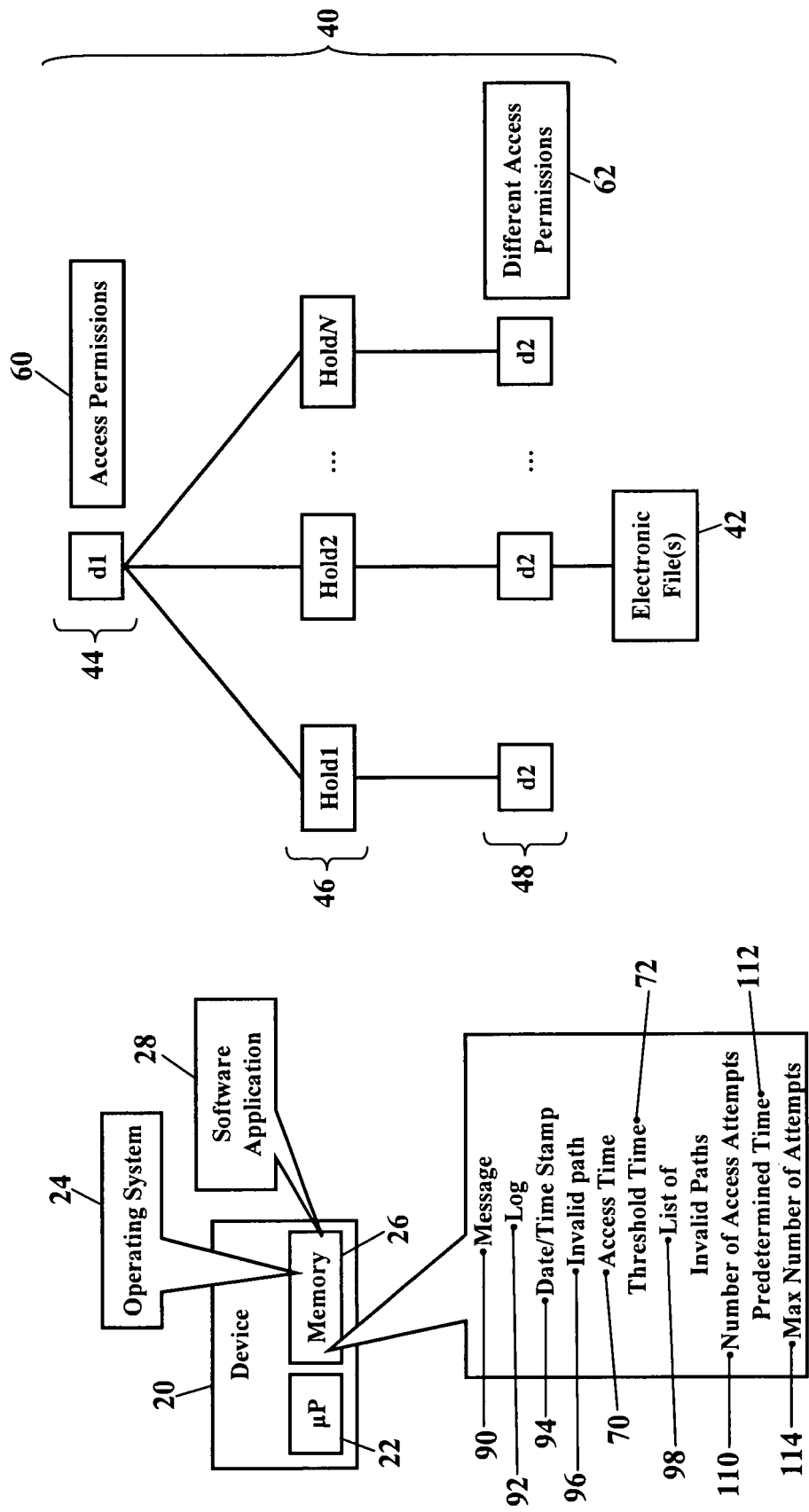

FIGS. 6-8 are schematics illustrating security enhancements, according to exemplary embodiments. FIG. 6 again illustrates the hierarchical file structure 40. Here, though, the hierarchical file structure 40 has multiple mid-level "hold" subdirectories 46 and, thus, multiple lower-level subdirectories 48. Each publicly accessible "hold" directory 46 may be concatenated to create a strongly secure path. If each directory {d1, d2, . . . d(N)} is owned by a different user (that is, each directory requires a different password or other access permissions), then multiple passwords have to be "cracked" to traverse the hierarchical file structure 40 to the desired electronic file(s) 42. Even if a hacker gains access to the directory "d1," for example, the hacker is "held" or confined within one of the multiple mid-level subdirectories 46 ({hold1, hold2, . . . hold(N)}). That is, the hacker is prevented from accessing or seeing beyond the current d(N) directory until the user satisfies one of the access requirements for the multiple lower-level subdirectories 48. Referencing FIG. 6, then, exemplary embodiments confuse the hacker by requiring multiple choices to further traverse the hierarchical file structure 40. Should the hacker authenticate the directory "d1" (illustrated as reference numeral 44), then the hacker must traverse one of the multiple mid-level subdirectories 46 ({hold1, hold2, . . . hold(N)}):

hold2/d2,
hold3/d2,
. . .
hold(N)/d2.

The hacker is thus presented with multiple choices and, thus, multiple authentication requirements. The hacker will not know the correct path sequence, so the hacker will have to guess which of the paths contains the desired file or data. Authorized users, however, will know the correct path and correctly authenticate to the desired directory location. Exemplary embodiments thus confine the hacker in one of multiple mid-level subdirectories 46 (e.g., {hold1, hold2, . . . hold(N)}) until a sublevel access permission is satisfied (such as the different access permissions 62). This confine-and-authenticate feature provides a more secure access structure for sensitive documents.

FIG. 7 illustrates security threats. The above paragraph explained how a potential hacker may be presented with multiple directory paths, thus requiring the hacker to guess which path contains the hacker's "pot of gold." The hacker, then, may require more time to access a desired directory, and the hacker will inevitably encounter invalid paths on wrong guesses. The authorized user, though, will quickly and efficiently traverse the hierarchical file structure 40 to the desired directory. Exemplary embodiments, then, may utilize access times and invalid paths to determine security threats.

As FIG. 7 illustrates, then, the operating system 24 and/or the software application 28 may monitor an access time 70 that is required to traverse the hierarchical file structure 40 to a requested directory or file (such as the electronic file 42). Exemplary embodiments may then use the access time 70 to determine the presence of a security threat or intrusion. The access time 70 may then be compared to a threshold time 72. If the access time 70 equals or exceeds the threshold time 72, then the access time 70 may represent a security threat. The offending access time 70, for example, may indicate that a hacker is attempting (or was successful) to fraudulently determine lower-level access permissions. The offending access time 70 may cause the operating system 24 and/or the software application 28 to enter a security mode 74 of operation, set an alarm 76, and/or send a security notification 78.

FIG. 8 illustrates additional security enhancements, according to exemplary embodiments. Here exemplary embodiments track or monitor information associated with invalid directory paths. As the above paragraphs explained, exemplary embodiments may hold or confine a user within one of the multiple mid-level subdirectories 46 {hold1, hold2, . . . hold(N)}. The user is prevented from accessing or seeing beyond the current d(N) directory until the user satisfies one or more of the different access permissions 62 associated with one or more of the multiple lower-level subdirectories 48. The user may thus be faced with multiple choices, and multiple authentication attempts, to traverse the hierarchical file structure 40. If the user fails to satisfy any access requirement, the operating system 24 and/or the software application 28 may log a message 90 denoting an "invalid directory path." The message 90 is returned when the user tries to access or search an invalid path. Exemplary embodiments, then, may create a log 92 of each occurrence of the message 90, along with a corresponding date and time stamp 94. Exemplary embodiments may also log the corresponding invalid path 96. Exemplary embodiments may also log the corresponding access time 70 associated with each invalid path 96. The log 92 may thus include a list 98 of invalid directory paths along with each corresponding date and time stamp 94 and invalid path 96.

The log 92 may be used to determine security threats. Exemplary embodiments may read or scan the log 92 for offending entries that may indicate security threats. As the above paragraphs explained, each access time 70 may be compared to the threshold time 72. If the access time 70 equals or exceeds the threshold time 72, then the offending access time 70 may indicate a security threat. Exemplary embodiments may also access more stringent rules, such as the number 110 of access attempts within a predetermined time 112. If a user exceeds a maximum number 114 of access attempts, for example, the user may be attempting to hack into the hierarchical file structure 40. A simple rule may even restrict the user to the maximum number 114 of access attempts before flagging a potential threat.

Exemplary embodiments are scalable. The public access permissions of the intermediate directory "d1/hold" may be contiguously applied in the hierarchical file structure (illustrated as reference numeral 40 in FIGS. 3 and 6-8) to create a scalable and secure access system. Because the user "holds" with global search permissions, exemplary embodiments may be contiguously applied to provide secure access to electronic files. The "d1/hold/d2" directory path structure may be repeatedly or contiguously applied as d1/hold/d2/hold/ . . . /d(N)/hold/sensitivedocument, with N representing an integer. Each directory {d1, d2, . . . d(N)} only allows access to its respective owner. That is, each directory d(N) may require different access permissions (e.g., passwords). Each "hold" directory may have the same permissions (such as 555 r-xr-xr-x). The path repository is thus 2N deep, with each directory d(N) being owned by a different user with access restricted to a single owner (i.e., chmod 700 d[1 . . . N] rwx - - - ). A complete traversal of the hierarchical file structure 40 (or "tree") may require successfully authenticating N different times. Increasing the protection strength means increasing the depth N and, correspondingly, the number of authentication attempts.

Figure 9:
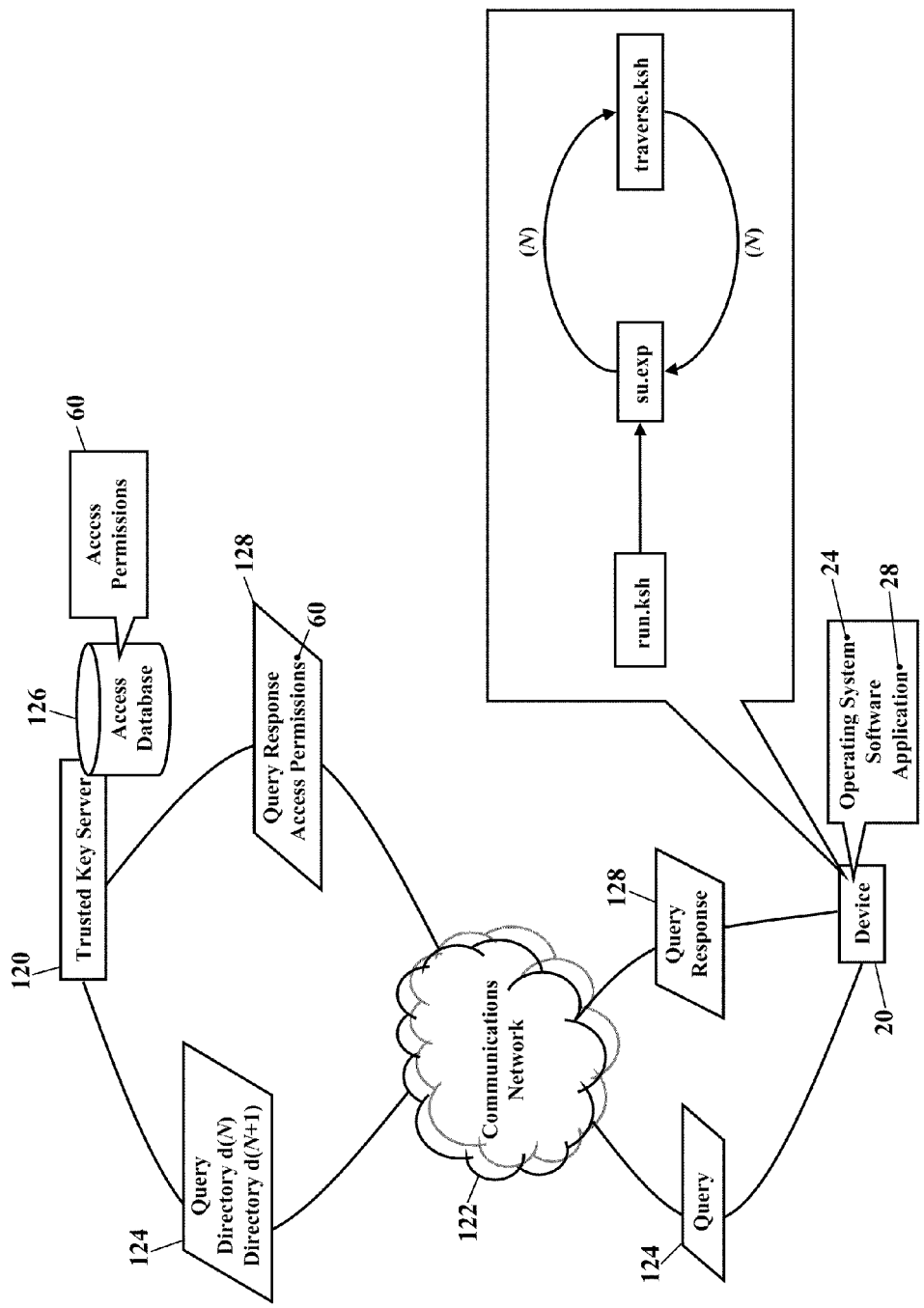

FIGS. 9-13 are schematics illustrating examples of enhanced file access structures, according to exemplary embodiments. These examples combine the strength of N different passwords or public keys in order to gain access to sensitive data. FIG. 9, for example, illustrates a trusted key server 120 that implements the "d1/hold/d2" directory path structure to create a very strong protection model. Conventional access schemes are all based on monitoring/alerting when suspicious access patterns are detected. The conventional access schemes are "best-effort" and only limit an amount of data stolen, using a single password per document repository. The conventional access schemes, however, cannot prevent access to sensitive data. Exemplary embodiments, then, may combine operating/file-system security practices with public-key encryption and trusted key-server technologies to create a novel combination of file system security and authentication key distribution.

As FIG. 9 illustrates, the device 20 communicates with the trusted key server 120 via a communications network 122. As each new directory d(N) is encountered when traversing the hierarchical file structure (illustrated as reference numeral 40 in FIGS. 3 and 6-8), the operating system 24 and/or the software application 28 may query the trusted key server 120 for the access permissions of the "next" d(N+1) directory in the path. A query 124 is sent to the trusted key server 120 via the communications network 122. The query 124 may include information that specifies the current directory d(N) and/or the next directory d(N+1) in the path. The trusted key server 120 retrieves the access permissions 60 (perhaps from an access database 126 that stores access permissions, passwords, and/or authentication requirements). The trusted key server 120 sends a query response 128 comprising the access permissions 60 (i.e., the credentials of the owner of the "next" d(N+1) directory in the path). When the device 20 receives the query response 128, the operating system 24 and/or the software application 28 may run the source codes "run.ksh," "su.exp," and "traverse.ksh" that are respectively illustrated in FIGS. 10, 11, and 12. The "su.exp" and "traverse.ksh" source codes (respectively illustrated in FIGS. 11 and 12) may be repeated for each number N of directories in the desired path. When the user is successful, the user may access a file or data at an end of the path.

Figure 13:
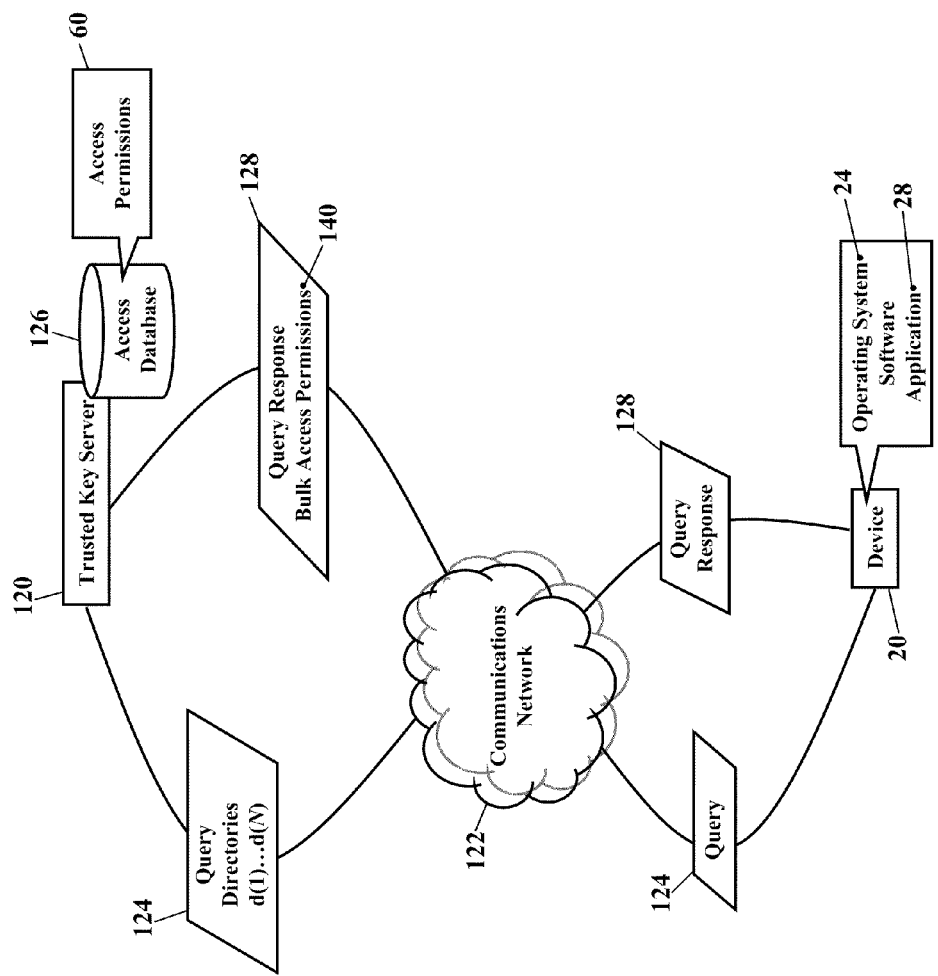

FIG. 13 illustrates bulk access permissions. When the operating system 24 and/or the software application 28 query the trusted key server 120 for access permissions, here the trusted key server 120 retrieves the access permissions 60 for the entire hierarchical file structure (illustrated as reference numeral 40 in FIGS. 3 and 6-8). The device 20, for example, may send information that identifies the hierarchical file structure 40 by path, name, number, or some other identifying information. The query 124 may additionally or alternatively identify each directory path {d1 . . . d(N)} in the hierarchical file structure 40. When the trusted key server 120 sends the query response 128, the trusted key server 120 sends bulk access permissions 140. That is, the trusted key server 120 sends all the access permissions 60 that may be required to traverse any path in the hierarchical file structure 40. This alternate mechanism may provide faster access times for a particular directory path. When the device 20 receives the query response 128, the operating system 24 and/or the software application 28 may again run the source codes "run.ksh," "su.exp," and "traverse.ksh" (respectively illustrated in FIGS. 10-12).

Exemplary embodiments may be applied regardless of networking environment. The communications network 122 may be a cable network operating in the radio-frequency domain and/or the Internet Protocol (IP) domain. The communications network 122, however, may also include a distributed computing network, such as the Internet (sometimes alternatively known as the "World Wide Web"), an intranet, a local-area network (LAN), and/or a wide-area network (WAN). The communications network 122 may include coaxial cables, copper wires, fiber optic lines, and/or hybrid-coaxial lines. The communications network 122 may even include wireless portions utilizing any portion of the electromagnetic spectrum and any signaling standard (such as the I.E.E.E. 802 family of standards, GSM/CDMA/TDMA or any cellular standard, and/or the ISM band). The communications network 122 may even include powerline portions, in which signals are communicated via electrical wiring. The concepts described herein may be applied to any wireless/wireline communications network, regardless of physical componentry, physical configuration, or communications standard(s).

Figure 14:
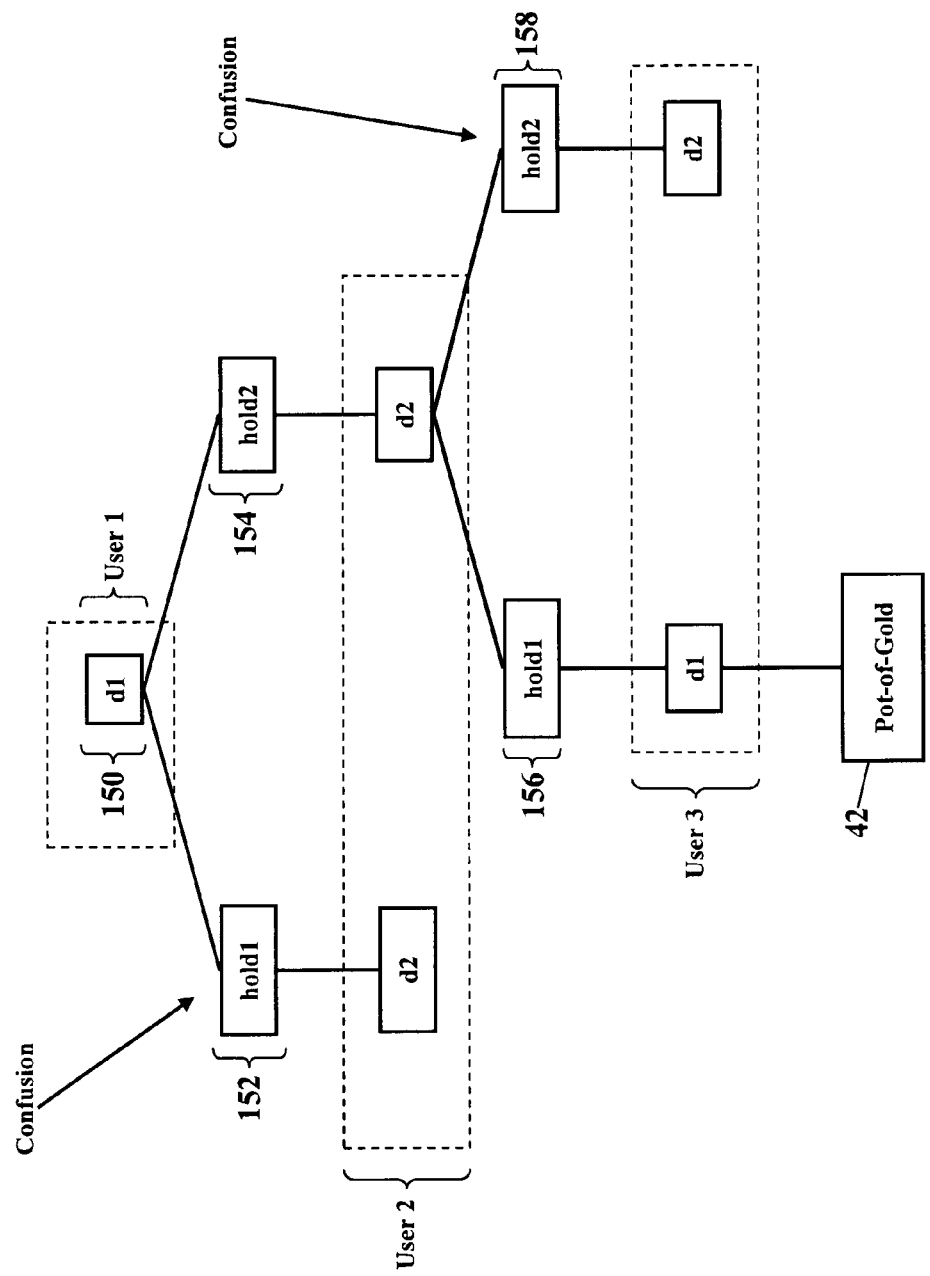

FIGS. 14 and 15 are schematics illustrating more examples of enhanced file access structures, according to exemplary embodiments. FIG. 14 graphically illustrates another hierarchical file structure 40, while FIG. 15 is a screen print of the physical structure. The desired electronic file 42 (e.g., the "pot of gold") has the following path
d1/hold2/d2/hold1/d1/potofgold.
If a potential hacker gains access to directory "d1" (illustrated as reference numeral 150), then the hacker is immediately presented with a choice of subdirectories "d1/hold1" and "d1/hold2" (illustrated, respectively, as reference numerals 152 and 154). The subdirectories "d1/hold1" and "d2/hold" are owned by a different user (e.g., "user 2"). The hacker must now successfully complete another authentication attempt (as defined by "user 2"), and the hacker must also select the correct path. If the hacker satisfies the "user 2" permissions for directory "d2," and the hacker correctly chooses path d1/hold2, then the hacker encounters more path choices. The subdirectories "d1/hold2/d2/hold1" and "d1/hold2/d2/hold2" (illustrated, respectively, as reference numerals 156 and 158) are owned by yet another different user (e.g., "user 3"). The hacker must again successfully complete another authentication attempt (as defined by "user 3"), and the hacker must also select the correct path. If the hacker satisfies the "user 3" permissions, and if the hacker chooses the correct path, then the hacker may access the desired file 42 (e.g., the "pot of gold").

Exemplary embodiments thus provide strong and scalable access protection in access file systems. Exemplary embodiments also provide programmatic access protection by combining operating system security at the file system layer with public key encryption. Exemplary embodiments also provide an alternative to file encryption, as a loss of an encryption key renders an electronic file unusable. Exemplary embodiments may also reduce or eliminate the chance of stolen data if a breach occurs, as long as the number of stolen passwords is less than N, where N corresponds to the directory layers d(1 . . . N), as explained above. As long as the number of stolen passwords is less than N, the sensitive document repository is inaccessible.

Figure 16:
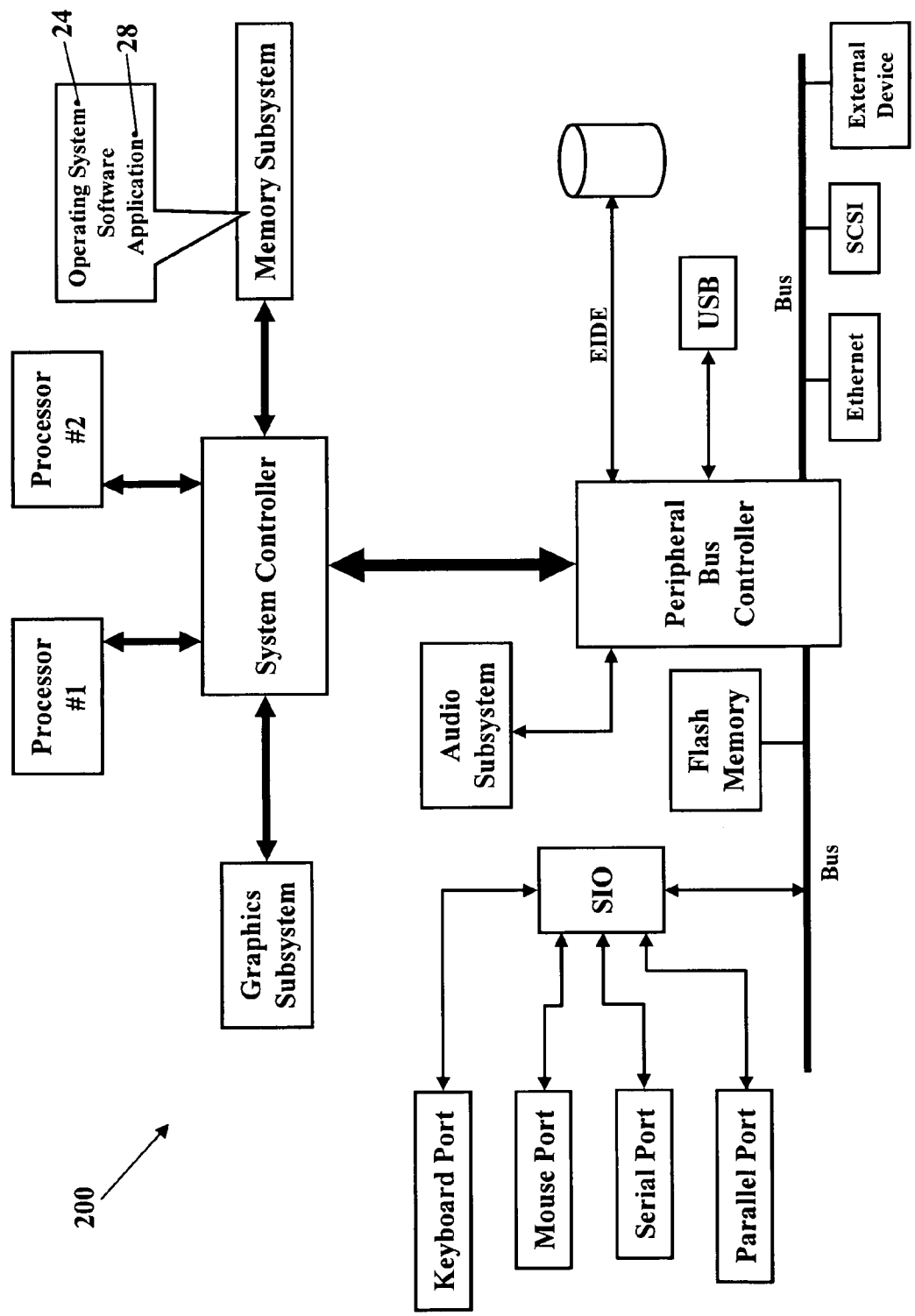
FIG. 16 is a schematic illustrating a generic block diagram incorporating an enhanced directory structure, according to exemplary embodiments.

FIG. 16 is a schematic illustrating still more exemplary embodiments. FIG. 16 is a generic block diagram illustrating the operating system 24, and/or the software application 28, may operate within a processor-controlled device 200. The operating system 24 and/or the software application 28 may be stored in a memory subsystem of the processor-controlled device 200. One or more processors communicate with the memory subsystem and execute the operating system 24 and/or the software application 28. Because the processor-controlled device 200 illustrated in FIG. 16 is well-known to those of ordinary skill in the art, no detailed explanation is needed.

Figure 17:
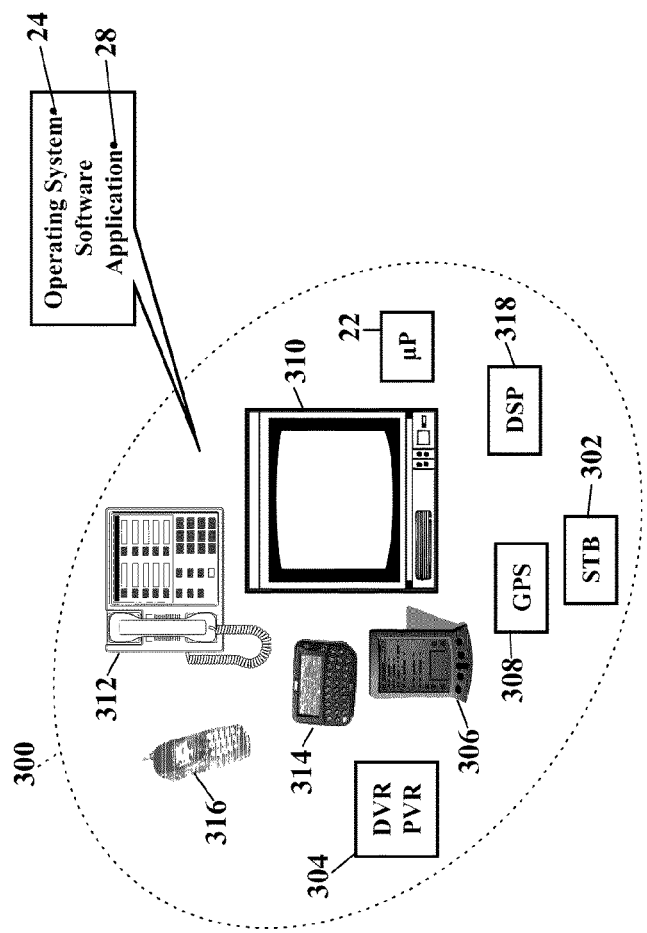
FIG. 17 depicts other possible operating environments for additional aspects of the exemplary embodiments.

FIG. 17 depicts other possible operating environments for additional aspects of the exemplary embodiments. FIG. 17 illustrates that the exemplary embodiments may alternatively or additionally operate within various other devices 300. FIG. 17, for example, illustrates that the operating system 24 and/or the software application 28 may entirely or partially operate within a set-top box ("STB") (302), a personal/digital video recorder (PVR/DVR) 304, personal digital assistant (PDA) 306, a Global Positioning System (GPS) device 308, an interactive television 310, an Internet Protocol (IP) phone 312, a pager 314, a cellular/satellite phone 316, or any computer system, communications device, or processor-controlled device utilizing the processor 22 and/or a digital signal processor (DP/DSP) 318. The device 300 may also include watches, radios, vehicle electronics, clocks, printers, gateways, mobile/implantable medical devices, and other apparatuses and systems. Because the architecture and operating principles of the various devices 300 are well known, the hardware and software componentry of the various devices 300 are not further shown and described. If, however, the reader desires more details, the reader is invited to consult the following sources: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment (Subscriber Identity Module— ME) interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, iTV HANDBOOK: TECHNOLOGIES AND STANDARDS (2004).

Figure 18:
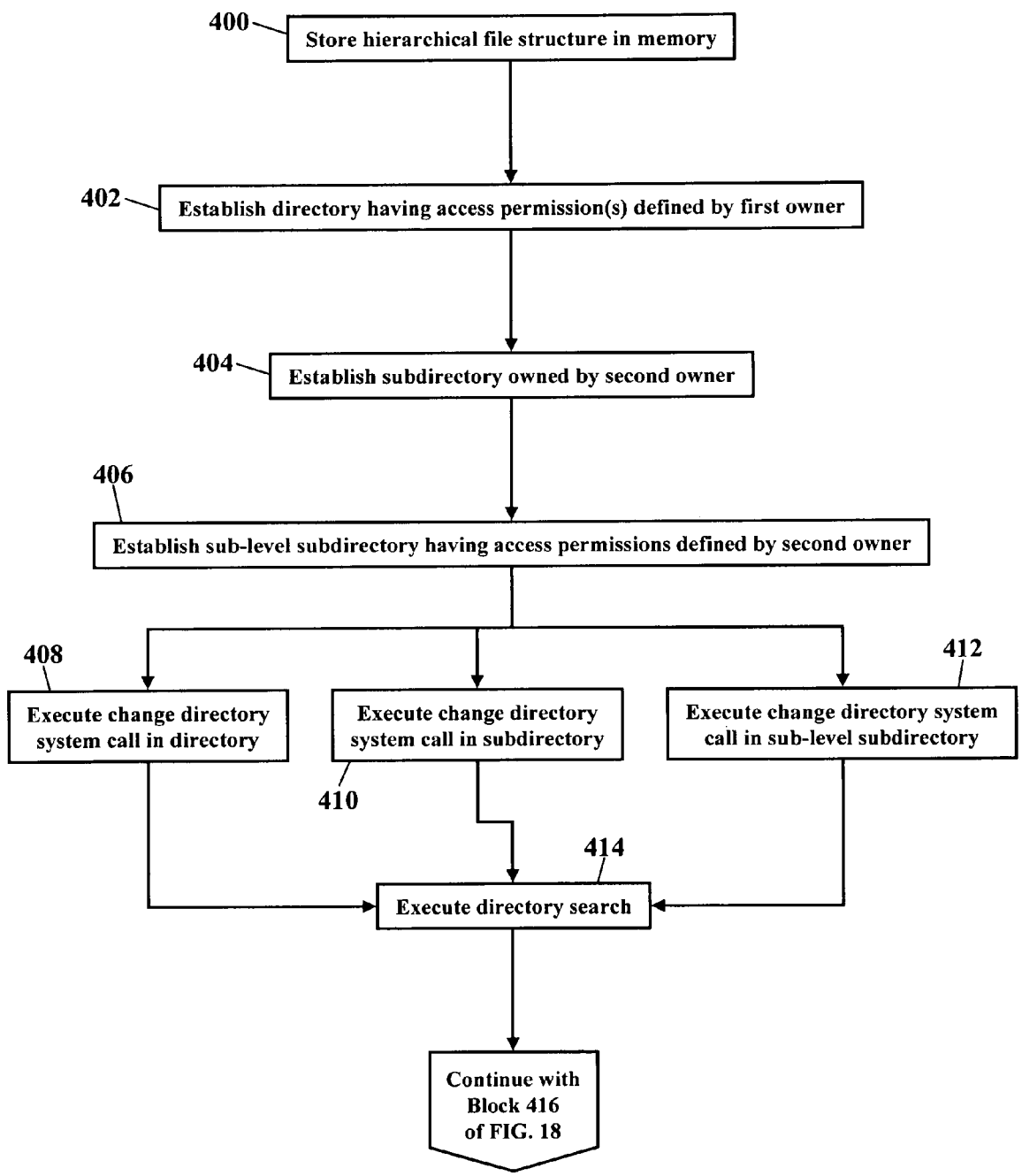
FIGS. 18 and 19 are flowcharts illustrating a method of securing access to a file system, according to exemplary embodiments.
Figure 19:
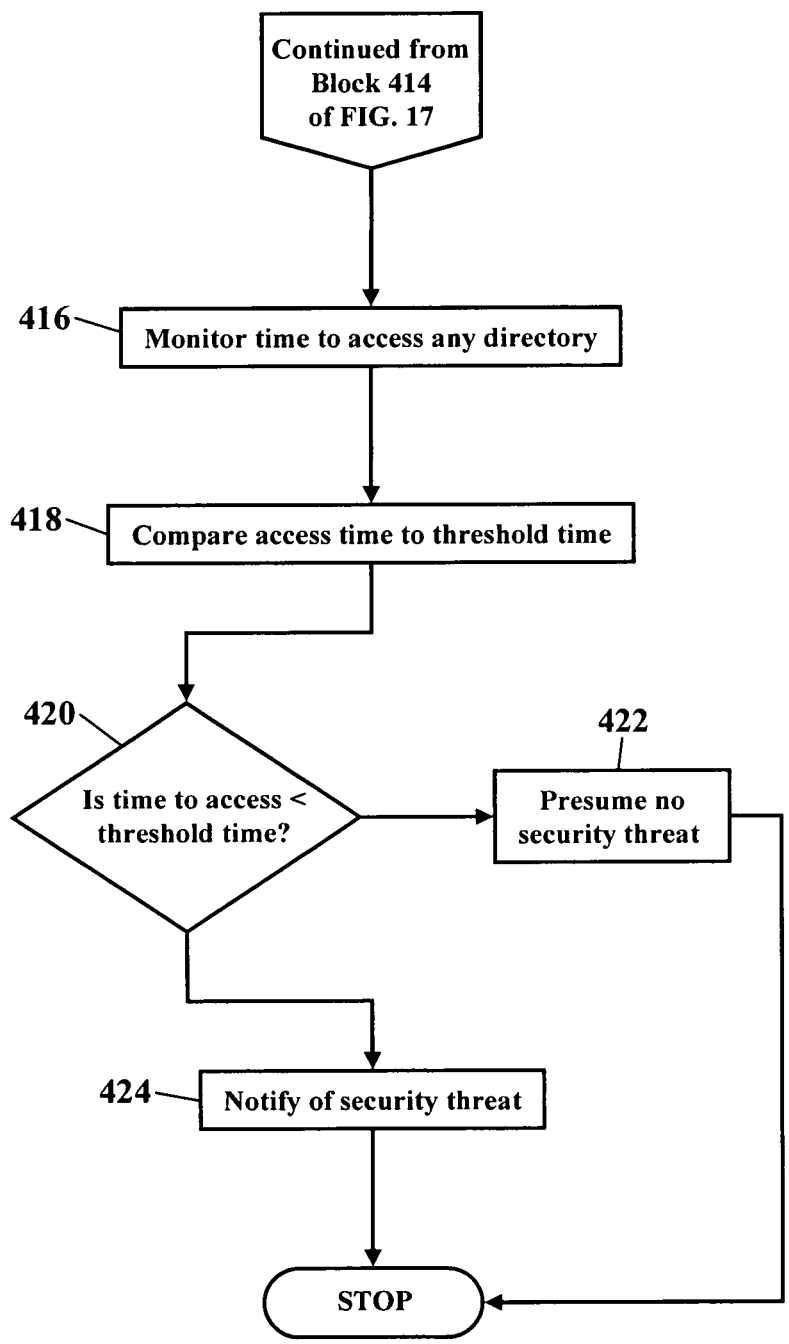

FIGS. 18 and 19 are flowcharts illustrating a method of securing access to a file system, according to exemplary embodiments. An operating system, having or accessing a hierarchical file structure, is stored in memory (Block 400). A directory is created, established, and/or accessed in the hierarchical file structure that has access permission(s) defined by a first owner (Block 402). A subdirectory is created, established, and/or accessed in the directory that is owned by a second owner (Block 404). A sub-level subdirectory is created, established, and/or accessed in the subdirectory having access permissions defined by the second owner (Block 406). A change directory system call is permitted to execute in the directory (Block 408), subdirectory (Block 410), and/or sub-level subdirectory (Block 412) for a user that successfully authenticates the access permission(s) of the directory. A directory search is executed (Block 414).

The flowchart continues with FIG. 19. A time to access the sub-level subdirectory is monitored (Block 416) and compared the access time to a threshold time (Block 418). If the time to access is less than the threshold time (Block 420), then no security threat is presumed (Block 422). If, however, the time to access is equal to or greater than the threshold time (Block 420), then a threat condition is notified (Block 424).

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. These types of computer-readable media, and other types not mention here but considered within the scope of the exemplary embodiments. A computer program product comprises processor-executable instructions for securing access to a file system.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method, comprising:

storing, in a memory device, an operating system having a hierarchical file structure;

executing, by a hardware processor coupled to the memory device, the operating system;

establishing, by the hardware processor, a directory in the hierarchical file structure having a first access permission defined by a first owner;

establishing, by the hardware processor, a mid-level directory in the directory, the mid-level directory having no access permission associated with the directory, the mid-level directory having multiple directory paths, each one of the multiple directory paths having a different access permission, and some directory paths of the multiple directory paths being purposefully invalid as invalid directory paths;

establishing, by the hardware processor, a subdirectory in the mid-level directory having a second access permission defined by a second owner different from the first owner defining the first access permission;

granting, by the hardware processor, access to both the directory and to the mid-level directory in response to a first successful authentication to the first access permission;

holding, by the hardware processor, the access in the mid-level directory until the second access permission is authenticated as defined by the second owner;

determining, by the hardware processor, a count of the invalid directory paths selected during authentication attempts while the access is held in the mid-level directory; and generating, by the hardware processor, a first security threat in response to the count of the invalid directory paths;

determining, by the hardware processor, a second successful authentication to the second access permission to the subdirectory;

determining, by the hardware processor, an access time to successfully authenticate to the second access permission to the subdirectory;

comparing, by the hardware processor, the access time to a threshold time;

granting, by the hardware processor, a traversal from the mid-level directory into the subdirectory in response to the access time being less than the threshold time;

determining a second security threat in response to the access time being equal to or greater than the threshold time; and generating an alarm in response to at least one of the first security threat and the second security threat.

2. The method according to claim 1, further comprising executing a change directory system call in the directory.

3. The method according to claim 1, further comprising executing a change directory system call in the subdirectory.

4. The method according to claim 3, further comprising executing a search of the directory.

5. The method according to claim 1, further comprising executing a search of the subdirectory.

6. The method according to claim 1, further comprising executing a search of the mid-level directory.

7. The method according to claim 1, further comprising monitoring the access time.

8. The method according to claim 1, further comprising setting an alarm in response to at least one of the first security threat and the second security threat.

9. The method according to claim 1, further comprising sending an electronic security notification that notifies of at least one of the first security threat and the second security threat.

10. The method according to claim 1, further comprising scanning a list of the invalid directory paths.

11. The method according to claim 1, further comprising:
traversing the hierarchical file structure to the directory; and
querying for the access permission defined by the first owner.

12. The method according to claim 1, further comprising creating at least one of the invalid directory paths.

13. A system for securing access to a file system, comprising:
a hardware processor; and
a memory device, the memory device storing an operating system having a hierarchical file structure, the operating system when executed causing the hardware processor to perform operations, the operations comprising:
establishing a directory in the hierarchical file structure, the directory having a first access permission;
establishing a subdirectory within the directory, the subdirectory having a second access permission different from the first access permission;
establishing a mid-level directory hierarchically between the directory and the subdirectory, the mid-level directory having multiple directory paths, each one of the multiple directory paths having a different access permission, and some of the multiple directory paths being purposefully invalid as invalid directory paths;
performing a first authentication for access to the directory according to the first access permission;
determining a first successful authentication to the first access permission to the directory;
granting traversal into the mid-level directory in response to the first successful authentication of the directory;
holding the traversal in the mid-level directory while a second authentication is performed;

generating a first security threat in response to a count of the invalid directory paths selected during the second authentication associated with the mid-level directory;
determining a second successful authentication to the second access permission to the subdirectory;
determining an access time required to successfully authenticate to the second access permission from the mid-level directory to the subdirectory;
comparing the access time to a threshold time;
granting the traversal from the mid-level directory into the subdirectory in response to the access time being less than the threshold time;
determining a second security threat in response to the access time being equal to or greater than the threshold time; and
generating an alarm in response to at least one of the first security threat and the second security threat.

14. The system according to claim 13, wherein the operations further comprise monitoring the access time to access the subdirectory.

15. The system according to claim 14, wherein the operations further comprise retrieving the threshold time.

16. The system according to claim 15, wherein the operations further comprise generating a notification associated with at least one of the first security threat and the second security threat.

17. The system according to claim 13, wherein the operations further comprise scanning a list of the invalid directory paths to determine the access time.

18. The system according to claim 13, wherein the operations further comprise:
traversing the hierarchical file structure to the directory;
querying for the first access permission defined by the first owner;
traversing the hierarchical file structure to the subdirectory; and
querying for the second access permission defined by the second owner.

19. A memory device storing instructions that when executed cause a hardware processor to perform operations, the operations comprising:
executing an operating system having a hierarchical file structure;
creating a directory in the hierarchical file structure having a first access permission;
creating a subdirectory in the directory having a second access permission;
establishing a mid-level directory hierarchically between the directory and the subdirectory, the mid-level directory having multiple directory paths, each one of the multiple directory paths having a different access permission, and some of the multiple directory paths being purposefully invalid as invalid directory paths;
determining a first successful authentication of the first access permission;
granting traversal into both the directory and into the mid-level directory in response to the first successful authentication of the directory;
holding the traversal in the mid-level directory while a second authentication is performed to the subdirectory;
determining a count of the invalid directory paths associated with authentication attempts during performance of the second authentication to the subdirectory;
comparing the count of the invalid directory paths associated with the authentication attempts to a maximum value;

determining a first security threat in response to the count of the invalid directory paths associated with the authentication attempts exceeding the maximum value;

determining a second successful authentication to the second access permission to the subdirectory;

determining an access time required to successfully authenticate to the second access permission from the mid-level directory to the subdirectory;

comparing the access time to a threshold time;

granting the traversal from the mid-level directory into the subdirectory in response to the count of the invalid directory paths associated with the authentication attempts being less than the maximum value and in response to the access time being less than the threshold time;

executing a change directory system call to the subdirectory in response to the second successful authentication; and determining a second security threat in response to the access time being equal to or greater than the threshold time.

20. The memory device according to claim 19, further comprising instructions for querying for the first access permission.

* * * * *